United States Patent [19]
Graunke et al.

[11] Patent Number: 5,852,826
[45] Date of Patent: Dec. 22, 1998

[54] PARALLEL MERGE SORT METHOD AND APPARATUS

[75] Inventors: Gary Graunke, Beaverton; Leonard D. Shapiro, Portland; Sujata Ramamoorthy, Beaverton, all of Oreg.

[73] Assignee: Sequent Computer Systems, Inc., Beaverton, Oreg.

[21] Appl. No.: 592,012

[22] Filed: Jan. 26, 1996

[51] Int. Cl.$^6$ .................................................. G06F 7/16
[52] U.S. Cl. ............................................................. 707/7
[58] Field of Search ................................ 395/607; 707/7

[56] References Cited

U.S. PATENT DOCUMENTS

| | | | |
|---|---|---|---|
| 5,179,699 | 1/1993 | Iyer et al. | 395/607 |
| 5,210,870 | 5/1993 | Baum et al. | 395/607 |
| 5,307,485 | 4/1994 | Bordonaro et al. | 395/607 |
| 5,414,842 | 5/1995 | Archer et al. | 395/607 |
| 5,421,007 | 5/1995 | Coleman et al. | 395/607 |
| 5,487,164 | 1/1996 | Kirchhofer et al. | 395/607 |
| 5,487,166 | 1/1996 | Cossock | 395/607 |
| 5,519,860 | 5/1996 | Liu et al. | 395/607 |
| 5,619,693 | 4/1997 | Troisi | 395/607 |
| 5,621,908 | 4/1997 | Akaboshi et al. | 395/607 |
| 5,640,554 | 6/1997 | Take | 395/607 |

OTHER PUBLICATIONS

Micah Beck et al., "Sorting Large Files on a Backend Multiprocessor," Cornell University, Mar. 1986.

Richard Cole, "Parallel Merge Sort," SIAM Journal on Computing, vol. 17, No. 4, Aug. 1988, pp. 770–785.

Richard Cole, "Parallel Merge Sort," 27th Annual Symposium on Foundations of Computer Science, 1986, pp. 511–516, IEEE.

Peter J. Varman et al., "An Efficient Multiprocessor Merge Algorithm," PARBASE '90, IEEE 1990, pp. 276–283.

Selim G. Akl et al., "Optimal Parallel Merging and Sorting WIthout Memory Conflicts, " IEEE Transactions on Computers, vol. C–36, No. 11, Nov. 1987, pp. 1367–1369.

Claudia Leopold, "A Fast Sort Using Parallelism within Memory," Proceedings of 4th IEEE Symposium on Parallel and Distributed Processing, Dec. 1992, pp. 326–333.

A.I. Verkamo, "Performance Comparison of Distributive Sort and MergeSort as External Sorting Algorithm," *The Journal of Systems and Software 10*, pp. 184–200 (1989).

M.J. Quinn, "Parallel Sorting Algorithm for Tightly Coupled Multiprocessors, " *Parallel Computing 6*, pp. 349–357, North–Holland (1989).

(List continued on next page.)

*Primary Examiner*—Paul V. Kulik
*Attorney, Agent, or Firm*—Klarquist, Sparkman, Campbell, Leigh & Whinston

[57] ABSTRACT

A parallel sorting technique for external and internal sorting which maximizes the use of multiple processes to sort records from an input data set. Performance of the sort linearly scales with the number of processors because multiple processors can perform every step of the technique. To begin, the records of a data set to be sorted are read from an input file and written into multiple buffers in memory so long as memory is available. The records within each buffer are then simultaneously sorted to create runs therein. A merge tree is constructed with the runs as stream elements into leaf nodes of the tree, where the stream elements are merged. The stream elements at each node are then merged by multiple processes working simultaneously at the node, thereby generating an output stream of elements for merging at a higher node. For an internal sort, the run that results from all of the merging is immediately written to an output device. For an external sort, the run is an intermediate run, written to secondary storage along with other intermediate runs. A forecast structure provides a forecast of the order of the run blocks from the multiple intermediate runs. These blocks are read in the forecasted order from secondary storage, written into memory and merged through a merge tree to form an ordered record stream that is a complete run for the data set. The ordered record stream is then written to the output device.

29 Claims, 4 Drawing Sheets

OTHER PUBLICATIONS

Dewitt et al., "Parallel Sorting on a Shared–Nothing Architecture Using Probabilistic Splitting, " *Proceedings of the International Conference on Parallel and Distributed Information Systems*, Miami Beach, FL (Dec. 1991), pp. 280–291.

Nyberg et al., "Alphasort: A RISC Machine Sort, " SIGMOD Record, v. 23, N. 2, 5, pp. 233–242, *Proceedings of the 1994 ACM SIGMOD International Conference on Management of Data*.

B.K. Iyer et al., "Percentile Finding Algorithm for Multiple Sorted Runs, " *Proceedings of the 15th International Conference on VLDB*, Amsterdam (1989), pp. 135–144.

Richard J. Anderson, "An Experimental Study of Parallel Merge Sort," *Dept. of CS Technical Report 88–05–01*, University of Washington, Seattle (1988), pp. 1–18.

Goetz Graefe et al., "Tuning a Parallel Database Algorithm on a Shared–Memory Multiprocessor," *Software Practice and Experience,*, vol. 22 (7), pp. 495–517 (Jul. 1992).

D. Knuth, *The Art of Computer Programming, vol. 3: Sorting and Searching*, Ch. 5.4.1, Addison Wesley, Reading, MA (1973), pp. 251–265.

Selim G. Akl, *Parallel Sorting Algorithms,* Academic Press (1985), pp. 193–210.

FIG. 1

| NAME | ADDRESS | EMPLOYEE NO. | YEARS OF SERVICE |
|---|---|---|---|

FIG. 4

| RUN NO. | BLOCK ADDRESS | KEY |
|---|---|---|
| 0 | 0 | AB |
| 1 | 0 | BC |
| 1 | 1 | HJ |
| 0 | 1 | JK |
| N | 0 | MP |
| 0 | 2 | OJ |

PARALLEL MERGE SORT METHOD AND APPARATUS

FIELD OF THE INVENTION

This invention relates generally to database management systems and more particularly to the sorting of records within a database.

BACKGROUND OF THE INVENTION

Sorting, which is generally defined as the rearrangement of data items into an ascending or descending order, is an important operation performed by a Database Management System (DBMS). In a DBMS, sorting is used for a number of purposes such as explicit order-by clauses, sort-merge joins, duplicate elimination, index builds, sub-queries, grouping and aggregation.

Figure 1:
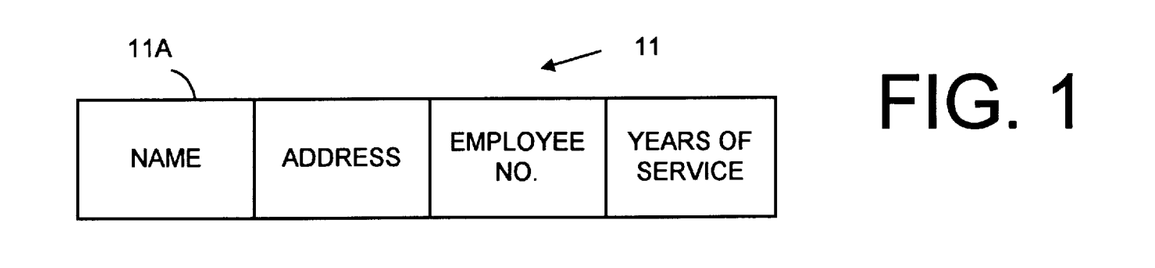
FIG. 1 is an example of a record for sorting in accordance with the invention.

To aid in an understanding of prior sorting techniques and how they compare with the invention, several terms are defined below:

- block: a predetermined number of records that can be manipulated as a unit, such as for reading from or writing to disk, tape or memory for sorting;
- data set: a set of data items such as records to be sorted, typically from an input file;
- external sort: a sort in which the space required for the data set exceeds the available internal memory space of a computer;
- internal sort: a sort in which all of the records to be sorted are contained within a computer's internal memory at one time;
- key: one or more fields within or associated with a record, the value of which determines a desired order of the records (for example, in FIG. 1 the name field 11A of a data record 11 for sorting in alphabetical order);
- merge: a process for combining multiple runs which were previously ordered on the same key into a single run ordered on that key;
- record: a data item containing one or more fields of distinct data (for example, name, address and employee no.); FIG. 1 is an example of a record;
- run: a collection of ordered items such as records, pointers, etc.;
- stream element: a run which is an element of a stream;
- stream: an ordered succession of stream elements.

A text which details the techniques of computer sorting is *The Art of Computer Programming*, Vol. 3, subtitled "Sorting and Searching" by Donald E. Knuth, Addison-Wesley Publishing Co., Inc. (Menlo Park, Calif., 1973). The Knuth work is hereby incorporated by reference.

A drawback of most prior sorting techniques is the time they require to complete. The volume of data managed by DBMSs is ever increasing and is presently on the order of gigabytes and terabytes for many large organizations, far exceeding the internal memory space of most computer systems. Sorting of such a large data set must then be done by an external sort, which slows the sorting process as data is continually moved between secondary storage and the computer's internal memory. In extreme cases, the data set may be so large that it cannot be sorted in a timely fashion. A large user, for example, may desire to sort overnight the data that it has gathered during the business day. If the sorting process is too slow, the data will not be sorted in the hours between the end of one business day and the beginning of the next.

With the advent of multi-processor computer systems, methods have been developed to accelerate sorting by breaking the sort operation into separate tasks that execute in parallel. Ideally, a sort that takes T units of time on a single processor would take T/p units of time on a multi-processor system with p processors each running a sorting process (assuming sufficient memory, storage, etc.). There are two traditional methods of parallel sorting. One method, known as a distributive sort, splits the data logically into predetermined groups, sorts each group simultaneously and then physically concatenates the results. Another method, known as a sort-merge, splits the data physically among processors into blocks, sorts each block simultaneously, and then logically merges the results.

In a distributive sort, the data set is initially split into predetermined groups according to a partitioning scheme, such as alphabetically on the first letter of a key. Separate processes (each running on a processor) then simultaneously sort the records within each group into corresponding runs. The runs are finally concatenated to provide a complete run. The distributive sort method can be faster than the sort-merge method because it requires no merge step after sorting; the sorted records are simply linked together. The challenge, however, lies in splitting the data evenly among processes to achieve maximum parallelism. An uneven distribution can cause a severe overflow at one process and require repartitioning. This advance knowledge of the data characteristics is required to avoid uneven distributions. There has been much research done to find algorithms that can estimate the data distribution based on sampling of the data set. However, these algorithms are inapplicable when the source of the data cannot be sampled (e.g., when the source is another process or is a serial device such as a tape).

The sort-merge method, on the other hand, requires no advance knowledge of data characteristics for optimum sorting. As the data is received it is simply divided among the multiple parallel processes into equal-sized blocks. Each process sorts its data block into a run according to the sorting criteria. These runs are then merged to form another run by comparing the first records in each run, selecting the smallest (or largest) and then repeating the process. A drawback, though, of the traditional sort-merge method is the final merge step. Whereas the sorting of the separate sections into runs fully uses the parallelism of a multiprocessor system, this is not so easily done in the final merging of these runs into a single run.

One approach for parallelizing the merge step is described by R. J. Anderson in his research report *An Experimental Study of Parallel Merge Sort*, which is also incorporated by reference. Anderson suggests that multiple processors (each running a sorting process) can be allocated to the merge step by dividing each of the runs to be merged into portions, merging the portions in parallel and concatenating the results into a complete run. For example, with two sorting processes employed in the merge step, one process works from the bottom of the two runs (sorting from smallest key value to largest) and the other works independently and concurrently from the top (sorting from largest key value to smallest). The processes continue to merge the runs until the processes meet, and the results are then concatenated to give a complete run. This approach can be extended to additional processes by assigning each process a specified number of records to merge. But there is greater overhead when more than two processes are involved because of the need to find the starting and ending points in the runs for each of the processes. Anderson suggests finding these starting points through a binary search algorithm, although he does not describe how the algorithm can be simultaneously applied to more than two processors each running a merge process simultaneously with the other.

The Anderson algorithm also assumes that all of the data to be sorted can fit into the computer system's internal memory at one time. This is not a realistic assumption in a business environment. As stated, the volume of data encountered today by DBMSs can easily outstrip the memory space of a computer system. Sorting this data must be done externally through multiple passes over the data, interacting with storage devices such as tapes and disks.

An objective of the invention, therefore, is to provide a novel method for the parallel sorting of data which linearly scales with the number of processors involved. Another objective is to maintain linear scalability for data sets where distribution is not known and cannot be sampled. Still another objective of the invention is to provide such a method for the external sorting of data, where the volume of data exceeds the internal memory space of the computer system. By overcoming the limitations of the prior art that have hindered prior parallel sorting techniques, the invention permits the full power of multiprocessor computer systems to be applied to the sorting of large volumes of data.

SUMMARY OF THE INVENTION

A method in accordance with the invention maximizes the use of multiple processes running in parallel to sort records from an input data set. Performance of the sort linearly scales with the number of processors because the multiple processors perform the steps of the method.

To begin, the records of a data set to be sorted are read from an input file and written into multiple buffers in memory. The records within each buffer are then simultaneously sorted to create runs therein. A merge tree is constructed with the runs as stream elements into leaf nodes of the tree, where the stream elements are merged. The stream elements at each node are then merged by multiple processes working simultaneously at the node, thereby generating an output stream of elements for merging at a higher node. For an internal sort, the run that results from all of the merging is immediately written to an output device. For an external sort, the run is an intermediate run, written to secondary storage along with other intermediate runs.

A forecast structure provides a forecast of the order of the run blocks from the multiple intermediate runs. These blocks are read in the forecasted order from secondary storage, written into memory and merged through a merge tree to form an ordered record stream that is a complete run for the data set. The ordered record stream is then written to the output device.

Apparatus in accordance with the invention comprises a computer system or other device for performing the above method.

The foregoing and other aspects, features, and advantages of the invention will become more apparent from the following detailed description of a preferred embodiment and the accompanying drawings.

DETAILED DESCRIPTION OF A PREFERRED EMBODIMENT

Figure 2:
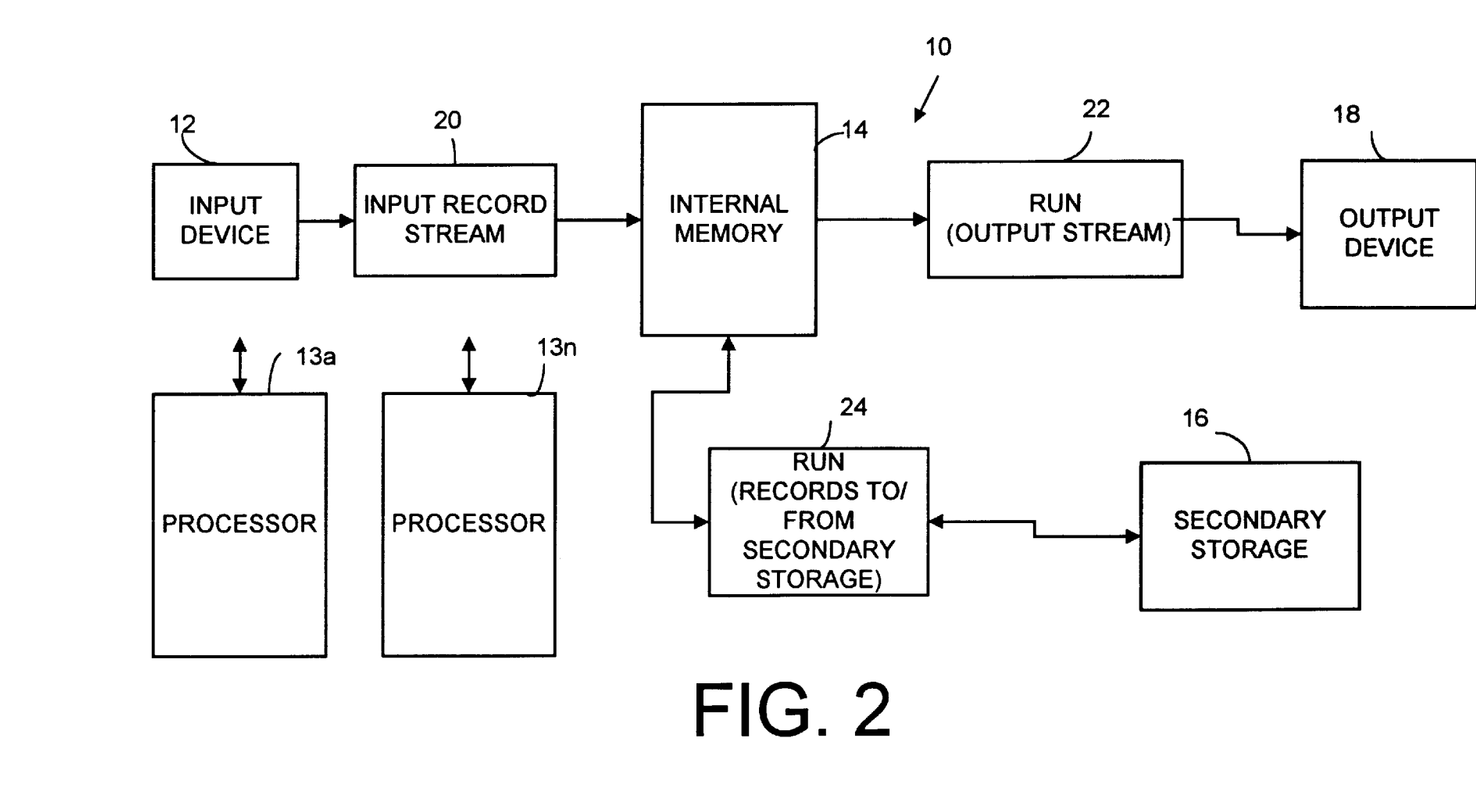
FIG. 2 is a functional block diagram of a multiprocessor computer system for sorting records in accordance with the invention.

FIG. 2 is a functional block diagram of a multiprocessor computer system 10 for sorting records 11 (FIG. 1) in accordance with the invention. The records include a number of fields such as the example fields in FIG. 1 and are sorted on a key such as field 11a. Examples of computer systems 10 are the Symmetry multiprocessor systems from Sequent Computer Systems of Beaverton, Oreg. The system 10 includes an input device 12; multiple data processors 13a through 13n working in parallel; internal computer memory 14; secondary storage 16; and an output device 18. The devices 12 and 18 may be any type of data source or destination such as a network, display printer, tape, disk, etc. Similarly, the secondary storage 16 can be any type of storage suitable for storing runs of data and for accessing each run independently. The figure shows the general flow of the records from the data set to be sorted through the computer system 10. Briefly, an input stream of records 20 is read from the input device 12 and written to the memory 14. There the records are sorted in accordance with the invention. If the entire data set fits within the memory 14, the ordered records are written as a complete run 22 directly to the output device 18. Otherwise, sets of ordered records are written as single intermediate runs 24 to the secondary storage 16. The intermediate runs that comprise the data set are then merged in accordance with the invention into a complete run 22 and written to the output device 18.

FIG. 2 is intended only as an example of a computer environment in which the invention may be used and is not intended to limit the invention to any specific computer architecture. From the following description of a preferred embodiment, it will be understood by those skilled in the art that the invention may be implemented on any of a number of multiprocessor computer systems, including non-uniform memory access multiprocessor computer systems.

The Sort Program

In the preferred embodiment, The invention is implemented in a sort program that executes on the computer system 10. The program includes an interface portion and a kernel portion. The interface encapsulates sort-independent details through a number of abstract data types (ADTs) using techniques well known in the art. For clarity, the details of the particular ADTs used are not described herein. They are fully described by Sujata Rathamoorthy in her Master's Thesis entitled *PSUsort: A Parallel External Sort for a Shared Memory Multiprocessor System*, Portland State University, 1995, which is also incorporated by reference. The kernel comprises code that, when executing on multiple processors 13a through 13n, implements a parallel sorting method in accordance with the invention.

At least several of the processes provided perform all of the sorting steps using a data partitioning approach to parallelizing programs. With this approach each process performs any of the sort tasks with any of the sets of data. For example, all of the several processes can handle the input and output of data (I/O) and perform copying, sorting, merging records, etc. Bottlenecks are avoided because the time spent on executing tasks is shared by the several processes. Load balancing is easier since the data can be partitioned evenly among the processes. Each of the several processes works with a subset of the data set and coordinates with others while choosing the subset. Scheduling is automatic as the processes move from one task to another. This approach also adapts automatically to the computing resources in the computer system 10, scaling sort performance to the number of available processors, I/O channels, disks, etc.

There are two phases to sorting in the present embodiment of the invention: a run generation phase and a final merge phase. In the run generation phase, the processes read data from the input device 12, create memory-sized, intermediate runs and store these runs in secondary storage 16. In the final merge phase, the processes read the intermediate runs from the secondary storage, merge them into a complete run and write the complete run to the output device 18. This implementation of the invention is a two-pass sort because each record in the data set is accessed twice. The first access occurs during the run generation phase when each record is read from input device 12 into internal memory 14. The second access occurs during the final merge phase when each record is read from secondary storage 16 into internal memory 14. The volume of data that can be sorted in two passes is determined by the size of internal memory 14 and the size of the input data set. If the data set is so large that two passes are not sufficient, the invention can be implemented as a multi-pass sort with more than two passes using the principles described above.

The Run Generation Phase

Figure 3:
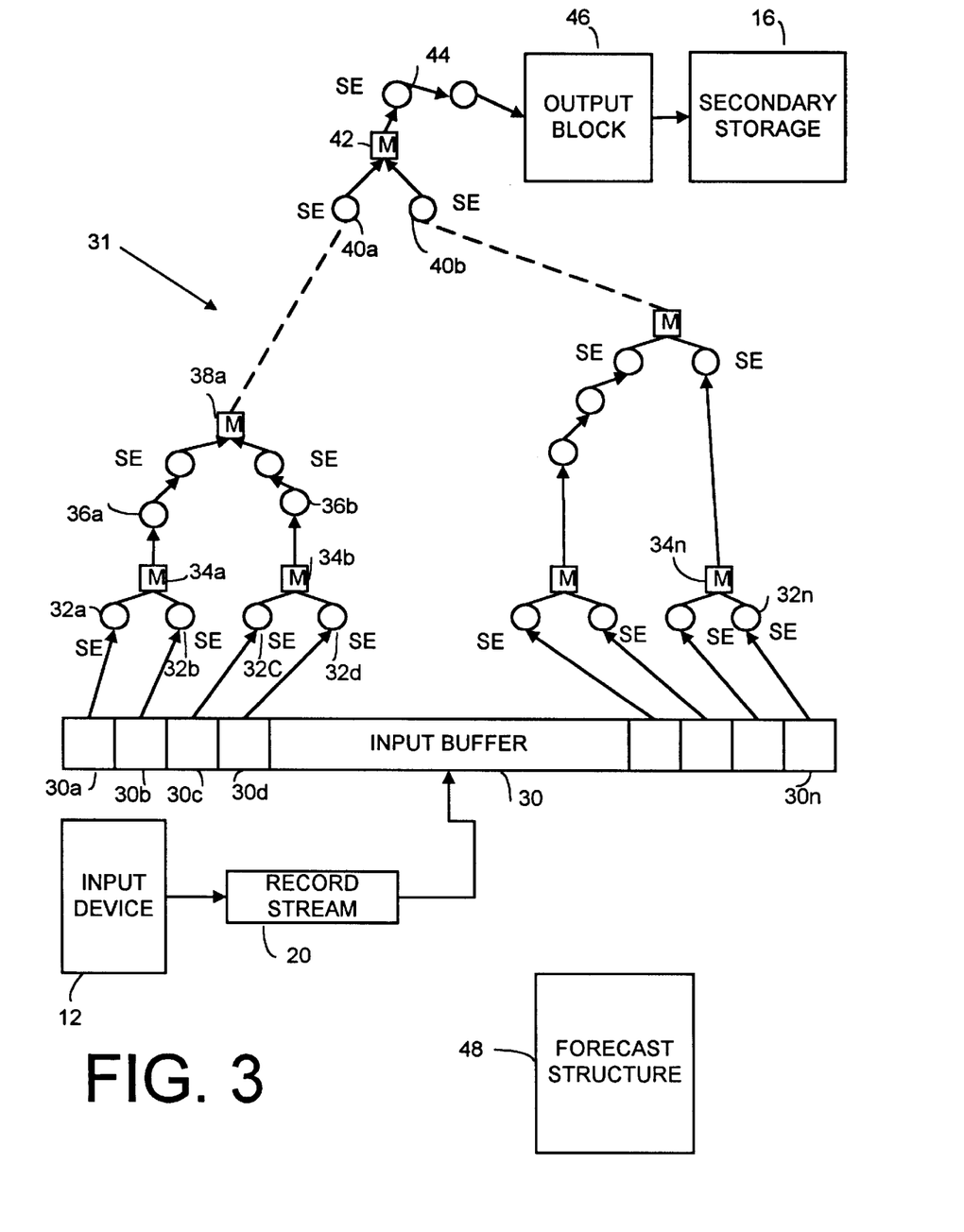
FIG. 3 is a data flow diagram of the run generation phase of a sorting method embodying the invention.

FIG. 3 is a data flow diagram of the run generation phase. Given the nature of the multiple processes generated by the computer system 10, a process could be working in any part of this phase at a point in time, assuming appropriate synchronization with other processes. Starting at the bottom of the figure, the input device 12 provides a stream 20 of records from an input data set. The processes running on system 10 read input blocks of data from the input stream 20 and write them into a series of input buffers 30 such as buffers 30*a–n* (which may be contiguous portions of memory or not) allocated in the memory 14. The number of buffers is determined by the size of the input block and the amount of internal memory available for buffers. From these buffers the records are sorted in a manner to be described.

To further improve the sorting speed, the input device 12 can be adapted for simultaneous reading at multiple locations, such as a series of separate disks across which the input data is "striped" (i.e., stored). The step of reading blocks of records from the input device 12 then comprises simultaneously reading blocks of records from the multiple locations of the input device and simultaneously writing the blocks to the buffers 30 within the memory 14.

The run generation phase has two parts: a tree construction part in which a merge tree 31 is constructed, and a run generation part in which a run is generated through the tree. A merge tree consists of merge nodes connected by streams of stream elements, as shown in FIG. 3. Table 1 below contains pseudocode describing the overall steps within each part of the run generation phase. Additional tables that follow describe several of these steps in more detail.

TABLE 1

While there is a block of input data to be read from the input device
   While there is sufficient memory available and data to be read do
     // tree construction part
     Read an input block of data from the input device;
     Form a record address vector (RAV) for the input block
       Sort the RAV;
       Form a stream element (SE) for the RAV;

TABLE 1-continued

Insert the SE into the merge tree and do appropriate
       merging. // Table 2
   Endwhile
   // run generation part
   Consolidate merge tree(s) into one tree;
   Set up the root (top) node of the tree:
   Merge and generate a single intermediate run.    // Table 3, Table 4
Endwhile In the tree construction part of the run generation phase, each of the processes reads an input block of data from the input device 12 and writes it to a buffer 30. Each process simultaneously with other processes then forms in the memory 14 an array of record addresses (i.e., pointers to the records in memory 14) called the RecordAddressVector (RAV) for the data block the process has written to the buffer. Each process then sorts the RAV it created on a designated key for the associated records using a conventional sorting method such as the Quicksoft algorithm. The use of RAVs and their pointers reduces the sorting time; however, the invention could be implemented with sorting of the actual records if desired. (For simplicity, sorting will be described in terms of records, although it should be understood from the context whether it is the record pointers that are sorted.) Each process then forms a stream element (SE) with its sorted RAV and some data structures for synchronization purposes. These stream elements are added to streams that connect nodes of a merge tree that is being constructed. In the present embodiment the streams between nodes are implemented as linked lists of stream elements, with the stream elements first in the stream being the first provided to a node.

The stream elements created from the RAVs are marked in FIG. 3 as elements 32*a–n*. These stream elements are preferably large enough to contain all the pointers of the associated RAVs (and therefore contain all the records of the associated input buffer). Stream elements of smaller size, of course, may be used. Stream elements 32 are then inserted into the merge tree and merged appropriately.

The inserting and merging of stream elements to construct the merge tree are shown in the pseudocode of Table 2 (where level L is taken to be level 0) and explained below.

TABLE 2

For I from level L to maxlevel do
  If no unpaired merge node exists at level I then
    Create a merge node at level I;
    Insert SE at I as child1;
    return,
  Else
    Insert SE as child2;
    Construct a merge at level I producing a SE for higher level merge
    node. // Table 3
  Endif
Endfor After a process forms a stream element 32 at the bottom level of the tree, it checks whether there already exists a leaf merge node 34 with an unpaired stream element. If no such node exists, then the process creates the leaf node and inserts its unpaired stream element into it. However, if such a leaf node exists, then the process inserts a second unpaired stream element into the node to pair up the elements. Once two stream elements are paired at a leaf node, a number of records from each element are merged at the node to produce as output a higher level stream element. This merging of stream elements and creating nodes continues until a level is reached in the merge tree where there are no more stream elements to be paired.

The just-described merge step must ensure two things, as shown in the pseudocode of Table 3 below. First, it must ensure that there are not too many records merged by one process. If the number of records is too large, then a process handling the merging can take too long to complete it, causing other processes to unduly wait. To ensure that the number of records to be merged by a process is not too large, a limit (labeled RECS_PER_MERGE (rpm) in the present embodiment) is set. Second, a process must ensure that the records reserved from each stream form a mergeable set in the sense that the merge results can be concatenated with the results of the next merge to form a run. Table 3 states this condition in the case where there are no duplicate keys in the records. The duplicative case is similar but more complex to state.

TABLE 3

Limit number of records from two streams together to be RECS_PER_MERGE.
Reserve r1 and r2 records (counting from 0) from the two streams using binary search such that (r1-1)th rec in stream 1 < r2th rec in stream 2 and (r2-1)th rec in stream 2 < r1th rec in stream 1.

In the merge step a process starts by identifying a certain number of records (rpm/2) from each stream into the node, beginning with the next record of the stream to be merged at the node. These next records are the starting points for the merge. The process then performs a binary search in the stream whose last identified record has the higher key, moving downward in the records toward lower keys until the conditions in Table 3 are satisfied. The records from the starting points to the r1th and r2th records (the ending points) in the streams are then reserved by the process for merging. The reserved records are merged at the node to form a higher level stream element.

Once the process has reserved its records to merge, it leaves new starting points for another process to merge records in parallel at the same merge node. A second process identifies rpm/2 records in each stream beyond the previous process's ending points. The second process then performs the binary search on the stream whose last identified record has the highest key, setting ending points when it completes it search. Additional processes can use these ending points in the same manner to perform additional merges at the node.

Once a process has determined what records it will merge, it begins merging them (the second part of the merge step). Ultimately several processes can perform the second part in parallel, dramatically increasing the rate at which records are merged at a node. This parallel merging is particularly useful when one portion of the merge tree is busy because of a skew in the data. Since multiple processes perform the merge, they need to reserve the records to be merged in a critical section that should be small for performance reasons. Thus, for the merge to be efficient the amount of time spent reserving records should be much smaller than the copying time. Processes reserve records from the two input streams using a binary search, and the time for the reservation of records is O(log N). The time for merging and copying is O(N). In general, reserving thousands of records per merge will be optimal since the logarithm of a thousand is much less than a thousand. But the number of records chosen to merge should not be too large or it causes a load imbalance. For example, with too many records to merge, the last process to finish holds up the other processes at the barrier before the final merge phase.

Once a process has reserved its records, it may begin merging the records it has reserved. Simultaneous merging of the records reserved by each process at a node follows. The records merged by each process are then concatenated to produce an output stream element at a higher level. The number of records in the output stream is RECS_PER_MERGE or fewer, depending on the ending points in the binary search.

Referring to FIG. 3 for an example, an equal number of records from stream elements 32a and 32b are identified (rpm/2). A process then performs a binary search on the stream element whose last identified record has the higher key, moving downward through the identified records. The reserved records are merged at node 34a to form a stream element 36a. The number of records in this stream element is at most RECORDS_PER_MERGE (rpm/2+rpm/2) and may be fewer depending on the outcome of the binary search. Stream element 36a becomes part of a stream of such elements that are merged with a stream containing stream elements 36b produced by leaf node 34b. To continue the tree construction, records from these elements are then merged at higher level node 38a, starting initially with rmp/2 records from each input stream.

Merging in the tree construction part of the run generation phase thus is normally from the bottom of the tree upward. As one process is merging stream elements 32 at leaf nodes 34 and progressing up the tree, other processes can be filling input buffers 30 and merging stream elements as well. However, sometimes the input streams into a node may run dry during the tree construction part because the initial number of records merged has been spread too thin throughout the growing tree. To prevent this from occurring, the process moves back down the tree, performing a lower level merge to "backfill" the shorter input stream and thereby provide more records to a higher level node. In the preferred embodiment, in moving down the tree the process picks the lower level node whose data will next be needed. This need can be determined in a number of ways. One way is to look at the input stream whose last record has the lower key. Another way is to look at the first record of the four input streams of the two lower level nodes and determine which record has the lowest key.

The steps of the tree construction part repeat until memory 14 is no longer available or the input data set has been completely read. At that point no more buffers 30 are used in memory 14 and no more leaf nodes are created. Because the act of reading data into the input blocks is performed simultaneously with the merging of stream elements, tree construction is almost complete by the time the last input buffer is filled.

The run generation part of the run generation phase begins with consolidating all sub-trees of the merge tree into a tree with a single root (i.e., top) node. Examples exist where the number of buffers 30 is not a power of two, such as six, ten, thirteen, etc. In such a case, there may be unpaired merge nodes at any level of the tree. Starting at the bottom of the tree, the unpaired nodes are paired to produce an output stream element and merge node that in turn is paired with the next highest unpaired node and so on until the sub-trees are consolidated into a tree with a single root node (such as node 42 in FIG. 3) through which all records must pass in being flushed from the tree.

With the merge tree consolidated, the run is generated by merging the records through the tree and writing them to secondary storage 16 or output device 18 (depending on the size of the data set). The flushing begins with merging of stream elements at root node 42 of the tree and continues downward to leaf nodes 32. Merging here is the same two-part step performed in the tree construction. Many processes such as five, eight, etc. can simultaneously participate in simultaneous merging at each node depending upon the number of processors in system 10 as described earlier in the tree construction part.

Table 4 contains pseudocode that describes in detail how merging operates throughout the merge tree during this part of the run generation phase. Node M is initially the root node. Merging of the runs begins at node M and proceeds toward the bottom of the tree.

TABLE 4

```
While true do
    Allocate records for a merge at node M        // Table 3
    If records available for merge, then
        Merge allocated records.
    Else if end of stream marker from both input streams reached, then
        Generate last end of stream marker at the output of node M.
        return
    If no child nodes exist then
        return
    Else
        Pick M to be the child that generated the smaller last record.
Endwhile
```

As a stream into the root node runs dry and more records are needed, a process seeking rpm records will follow the stream with the lowest key to the next node down the tree in pursuit of additional records. For example, with reference to FIG. 3, assume that the key of the last record in the stream containing stream element 40a is abc and the key of the last record in the stream containing stream element 40b is def. If a process attempting to merge records from these two streams cannot find rpm/2 in each stream, it proceeds to node 38a and merges stream elements 36a and 36b to obtain more records for the stream feeding node 42. Similarly, when the streams into node 38a begin to run dry, a process will proceed to node 34a or 34b to merge records from the streams feeding into these nodes. This procedure of moving from the top to the bottom of the merge tree 31 is followed by all of processes that perform merging. When a process reaches a leaf node, it then returns to root node 42 which now has additional records to merge. In this manner the merge step is repeated from top to bottom until all of the records within memory have been flushed from the merge tree.

If the run of records flushed through the merge tree is all the records of the input data set, then the run is complete and is written to output device 18. If the records do not represent the complete data set, then the run is an intermediate run that is written to the secondary storage 16. Pseudocode for merging and generating a run is shown in Table 5. As the pointers representing the records are flushed from the tree in stream elements 44, the records themselves are copied from their input buffers into an output buffer in memory (not shown). As they are copied to the buffer they are grouped in run blocks within a larger output block 46. The output block (rather than the records or run blocks individually) is then written to secondary storage 16 to reduce the number of disk accesses. As will be seen, the run blocks are read from the secondary storage 16 during the final merge phase. The use of an output block is helpful in writing ordered records to the secondary storage or the output device but is not necessary to the invention. If desired, the records could be written directly from the various input buffers to storage.

TABLE 5

```
While root SE is not the last stream element do
If root stream empty then
    Generate SEs at root node by performing merges top to bottom.
    // Table 4
Else
    Select the top SE from the root stream.
    If internal sort (data set completely within memory) then
        Write to output device
    Else
        Copy records to output buffer, saving forecasting structure
        entries.
            Flush output block when full to secondary storage.
Endwhile
```

To further improve the sorting speed, the computer system 10 can be adapted to simultaneously write run blocks of the intermediate run to multiple locations in secondary storage 16, such as to a series of separate disks across which the sorted output data stream may be striped.

During the run generation phase for an external sort, a forecast structure 48 (FIG. 3) such as a table or any other suitable data structure is generated with an entry for each run block written to the secondary storage. The forecast structure initially contains an unsorted list of the intermediate runs as they are stored to the secondary storage, indicating for each run the disk address for each run block and the first key in each run block. The forecast structure may reside in memory or secondary storage.

For an input data set requiring external sorting, all the processes synchronize at a barrier after every intermediate run generation. Intermediate runs are generated until the last input data is read from the input device 18, sorted into buffers 30, flushed through merge tree 31 and written to secondary storage 16.

The Final Merge Phase

The final merge phase is used when external sorting is required to sort the input data set. In this situation the volume of input data to be sorted exceeds the space in memory 14, requiring that several intermediate runs be formed to sort the data. As described, these runs are stored temporarily in secondary storage 16. During the final merge phase, the intermediate runs are read from the secondary storage into memory 14 and merged into a complete run that is written to output device 18. The final merge phase is described with reference to FIGS. 4 and 5 and the following tables of pseudocode.

Figure 5:
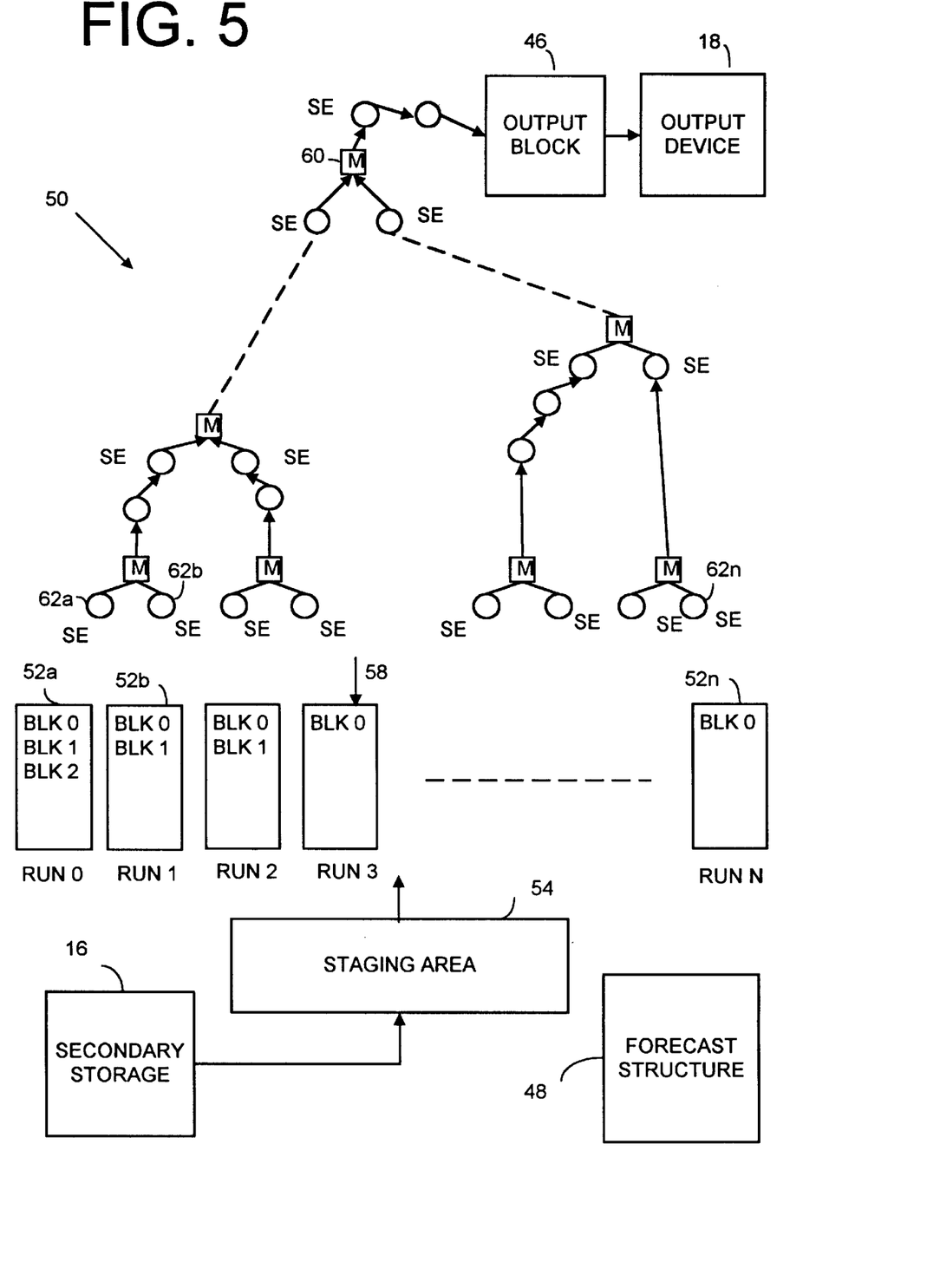
FIG. 5 is a data flow diagram of the final merge phase of a sorting method embodying the invention.

FIG. 5 shows a merge tree 50 for the final merging, a number of forecast streams 52 (e.g., lists) for forecasting which run blocks will next be merged, and a staging area 54 for storing these forecasted blocks in memory as they are read from secondary storage 16. All of these data structures are present in memory 14. Merge tree 50 is constructed so that each intermediate run forms an input stream to the tree. For example, if there are N intermediate runs from the input data set, then there are N input streams to be merged through the leaf nodes of merge tree 50.

The overall steps of the final merge phase are shown in the pseudocode of Table 6.

TABLE 6

```
Sort the forecast structure.
Distribute initial forecast to forecast streams.      // Table 7
Read run blocks from secondary storage using forecast // Table 7
streams.
```

TABLE 6-continued

| | |
|---|---|
| Construct merge tree. | // Table 7 |
| Perform merges to generate complete run. | // Tables 7, 8, 9 |

Figure 4:
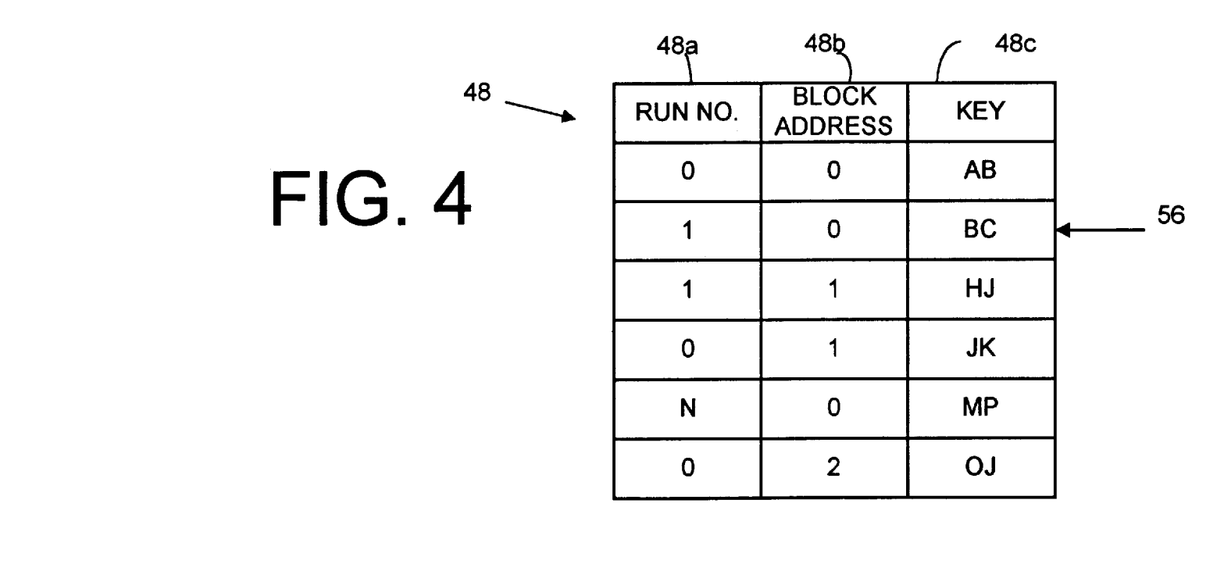
FIG. 4 shows a forecast structure whose entries are sorted in accordance with the invention.

The final merge phase may also be thought of as having a tree construction part and a run generation part, although the two parts in this phase overlap. To begin the tree construction part, one of the several processes initially sorts forecast structure 48 by the first key of each run block while the other processes begin constructing the merge tree. FIG. 4 is an example of a sorted forecast structure 48. As illustrated, each entry has a field 48a for the run number, a field 48b for the run block disk address and a field 48c for the first key in the run block. In the example, the forecast structure is sorted in ascending order (A<B).

The processes construct merge tree 50 by reading run blocks from secondary storage 16 into memory and merging them. Table 7 contains pseudocode that describes in more detail how this merging is done in the preferred embodiment 50.

TABLE 7

While not end of forecasting structure and memory available > a run block do // Memory check
    Get the next entry from the forecasting structure // Fill forecast streams
    Add entry info to the forecasting stream list of the corresponding run.
Endwhile
While runs visited < total number of runs or enough blocks not read do // Construct tree and merge,
    Choose a run for reading using a shared index;
    While the read list for the run is not exhausted do
        Combine contiguous run blocks from the read list up to KMAX
        Perform a single read for the contiguous blocks.
        Form a stream element and add to the merge tree.
        Get the first unread key info from the next entry in the forecast structure into the forecast stream for the run.
    Endwhile
Endwhile Initially the forecast table distributes a forecast of run blocks to be merged to the forecast streams 52. This initial forecast contains the first M run blocks in the forecast structure, where M is the number of run blocks that can be stored at one time in staging area 54. As they are read from the forecast structure, the run block addresses are listed in their associated run forecast stream. Using the forecast structure entries in FIG. 4 as an example with M being four, structure 48 would distribute addresses for the first four entries in the structure to forecast streams 52a and 52b. The other forecast streams would not receive run block addresses until space is available in staging area 54 for storing the associated run blocks. A pointer 56 is used to keep track of the next structure entry to be distributed to the forecast streams.

Once addresses for the run blocks in the initial forecast have been distributed to the forecast stream, the several processes read the run blocks listed in the streams into staging area 54. This reading is done run by run through the use of another pointer 58 that points to the next forecast stream to be read. Pointer 58 repeatedly moves in circular fashion from stream 52a to 52n. Pointer 58 initially points to stream 52a (run 0), a process reads the run blocks identified in forecast stream 52a into staging area 54. A process reads a number of run blocks (up to a maximum number) in one access to secondary storage where the run blocks are contiguous in secondary storage and appear concurrently in a run's forecast stream, such as in stream 52a. The pointer moves to the next forecast stream and a process reads the blocks listed therein into the staging area. These steps repeat until the processes eventually read all of the run blocks from secondary storage 16 into staging area 54.

After a process has read a series (one or more) of run blocks into the staging area, it generates an RAV and then a stream element for a run block using the same algorithm described in Table 2. In FIG. 5, for example, a process generates a stream elements 62a from run block 0 of run 0. The process then inserts the SE into merge tree 50 at a leaf node and performs merges from the leaf node to a level in the tree at which there is no stream to pair with, again as described in Table 2. Finally, the process reads the key from the first record of the next run block in the forecast structure for avoiding deadlock, for reasons to be described.

The acts of reading the forecast streams, reading the blocks identified in the run forecast stream into the staging area, generating RAVs, SEs and merging them, etc. are carried on in parallel by the several processes. This leads to a quick construction of merge tree 50. Unlike in the run generation phase, however, merge tree 50 can begin flushing records before the tree reaches its full size because run blocks read into staging area 54 are already sorted. It is not necessary to have a run block from every run in the merge tree to begin merging these ordered records.

The run generation part of the final merge phase begins with the flushing of records through a root node. In FIG. 5 the root node is marked 60, but it should be understood that the initial root node may be in a lower level if, for example, records are flushed from merge tree 50 before a run block from run N is read into staging area 54.

Merging in the final merge phase is performed in the same manner as in the run generation part of the run generation phase, except that the merging is done from the bottom of the tree towards the root (top) node as shown in Table 8.

TABLE 8

Pick a leaf node M that has records to merge
While true do
    Allocate records for merging at node M     // Table 9
    If records available for merge then
        Merge allocated records
    Else if last stream elements from both input streams then
        Generate last stream element for the output of node M
    If parent of node M available then
        let M point to the parent node.
    Else
        return
Endwhile As a process completes merging at one node, it proceeds upward toward the next level node. When more than one process reaches a node, each merges a stream element in parallel with the other processes at the node and then continues up the tree. When a process can no longer move up the tree to merge records, it follows pointer 58 to find the next run blocks to be read into staging area 54. The process then advances the pointer, reads the listed blocks into the staging area, and repeats the steps of forming an RAV, SE, merging, etc, as described in Table 7.

Additional run blocks are written to staging area 54 as the records of the complete run are flushed from root node 60 and memory is made available in the stageing area. In the present embodiment, a check is made for available memory each time pointer 58 completes a loop through the forecast streams. In FIG. 5, for example, the memory check is made after pointer 56 advances from stream 32n to stream 32a. Other memory checks, of course, can be used. The present memory check is described in Table 7.

When multiple devices are used for the secondary storage, the large blocks of data can be allocated in a random fashion to allow simultaneous reading of data from the storage. Alternatively, the run blocks can be striped across several storage devices to increase read bandwidth.

In the final merge phase, deadlocks may be a problem since all of the data are not available in the merge tree while performing merges. For example, in the run generation phase a minimum number of records are reserved, or allocated, for each merge to limit the overhead of allocation. But in the final merge phase a minimum allocation requirement can result in a deadlock when memory conditions are tight. To avoid this deadlock, whatever records that are available at a node are merged.

A deadlock may also arise if data is not available at both input streams to a node. Since data are read from the secondary storage per the forecast structure, skewed data could cause one of the streams to become dry. This can result in a deadlock if data is not available in the required streams and the memory is full. This deadlock is avoided by the use of the forecast structure 48. Since it has the first key information for each run block, each run can be marked with the first key that is unread so far. This information can be propagated up the tree so that records can pass through a node so long as they are lower than the key of the first unread record.

The merging of records throughout merge tree 50 produces a complete run of the records in the input data set. This complete run is continually written to the output device 18 as the run is being generated. As in the run generation phase, the records in the complete run are preferably copied from staging area 54 into an output buffer and then written as output blocks to the output device 18. And as in storing the intermediate runs, computer system 10 can be adapted to simultaneously write records to multiple locations such as by "striping" the data across several individual output devices. Writing the output stream to the output device then comprises writing portions of the output run in parallel to the multiple locations. Table 9 contains pseudocode that describes a preferred manner for writing the output stream to the output device 18.

TABLE 9

```
While root SE not the end of stream marker do
    If root stream from the merge tree is empty then
        Generate stream element at root by performing merges bottom
        to top // Table 8
    Else
        Pick the top stream element from the root stream
        Write to output device.
        For each record address in the stream element do
            If record address points to last record in the page then
                mark the page as free for recycling
            Endif
        Endfor
    If reading from secondary storage not done yet then
        Read run blocks from secondary storage.
            Endif
    Generate SEs at root by performing merges bottom to top
Endwhile
```

Having illustrated and described the principles of the invention in a preferred embodiment, it should be apparent to those skilled in the art that the preferred embodiment can be modified in arrangement and detail without departing from such principles. For example, many of the software aspects of the embodiment may be implemented in hardware and vice versa.

The embodiment described is a two-pass sort; but if the data set is large enough that two passes are not sufficient, it may be easily extended to a multi-pass sort of more than two passes. The records to be sorted may be of fixed or variable length. Features that may be added to improve cache effect include the use of processor affinity, the scheduling of merges in the merge trees and the placement of key prefixes in the RAVs. Conditional locking may also be added to remove lock waiting. Steps described above in sorting records can often be executed in different order as known to those of skill in the art.

In view of the many possible embodiments to which the principles of the invention may be applied, it should be recognized that the illustrated embodiment is only a preferred example of the invention and should not be taken as a limitation on its scope. The invention is limited only by the scope of the following claims. We therefore claim as the invention all that comes within the scope of these claims.

We claim:

1. A method of sorting records with a multiprocessor computer system having memory and a set of processes running in parallel, comprising:

a) repeating the following steps a.1–a.5 until the records to be sorted are read from an input device and stored in secondary storage:
      a.1) reading blocks of records from the input device and writing the blocks to memory;
      a.2) sorting the records within each block simultaneously to create a run;
      a.3) constructing a merge tree in memory for merging the runs into an intermediate run that is output by the tree, the merge tree having nodes where two runs are merged to form another run;
      a.4) simultaneously merging the runs throughout the merge tree to form the intermediate run; and
      a.5) writing the intermediate run to secondary storage;
   b) after the records to be sorted are stored in intermediate runs in secondary storage:
      b.1) determining an order in which run blocks of the intermediate runs will be read from secondary storage;
      b.2) constructing a merge tree for merging the run blocks into a complete run that is output by the tree, the merge tree having nodes where two runs are merged to form another run;
      b.3) reading the run blocks from the secondary storage and writing the run blocks to memory in the determined order for merging in the merge tree;
      b.4) simultaneously merging runs throughout the merge tree to form the complete run; and
      b.5) writing the complete run to an output device.

2. The method of claim 1 wherein the input device is adapted for simultaneous reading at multiple locations and the step of reading blocks of records from the input device and writing the blocks to memory comprises simultaneously reading blocks of records from the multiple locations of the input device and simultaneously writing the blocks to memory.

3. The method of claim 1 wherein the step of sorting the records within each block comprises:

forming a vector of record addresses for blocks of records within memory; and
   sorting the addresses within the record address vectors.

4. The method of claim 1 wherein the step of constructing a merge tree comprises pairing up runs at a node at one level and merging at the node a number of sorted records from the paired runs to form a third run, the third run then paired with a fourth run at a node at a higher level.

5. The method of claim 1 wherein the step of simultaneously merging the runs throughout the merge tree comprises:

having more than two processes reserve portions of the two runs for merging at a node; and having the processes simultaneously merge their portions of the runs at the node.

6. The method of claim 1 wherein the step of writing the intermediate run to secondary storage comprises having at least two processes simultaneously write records of the run to multiple locations of the secondary storage.

7. The method of claim 1 wherein the step of writing the intermediate run to secondary storage includes making an entry for each run block into a forecast structure.

8. The method of claim 1 wherein the step of determining an order in which run blocks of the intermediate runs will be read from secondary storage comprises:

making an entry for each run block into a forecast structure including the key of the first record in the run block; and sorting the entries in the forecast structure by the key of the first record of each run block.

9. The method of claim 1 wherein reading the run blocks from the secondary storage comprises reading multiple run blocks in the same read access.

10. The method of claim 1 wherein the step of reading the run blocks from the secondary storage and writing the blocks to memory in the determined order is performed simultaneously with the steps of merging runs to form a complete run and writing the complete run to the output device and freeing memory for more reading.

11. The method of claim 1 wherein the step of simultaneously merging the runs throughout the merge tree comprises:

having several processes reserve consecutive portions of the two runs for merging at a node; and having the several processes simultaneously merge their portions of the runs at the node by performing a binary search on only one of the runs.

12. The method of claim 1 wherein the step of constructing a merge tree for merging the runs into an intermediate run includes merging records at a lower level node to provide additional records at a higher level node for continuing the tree construction.

13. The method of claim 12 wherein merging records at a lower level includes selecting a lower level node whose data will be needed next for merging at the higher level node.

14. A computer-readable medium for storing a computer program comprising instructions for executing the method of claim 1.

15. A method of sorting records with a multiprocessor computer system having memory and a set of processes running in parallel, comprising:

reading blocks of records from an input device and writing the blocks to memory;

sorting the records within each block simultaneously to create a run therein;

constructing a merge tree for merging the runs into a larger run that is output by the tree, the merge tree having nodes where two runs are merged;

simultaneously merging the runs throughout the merge tree to form the larger run by having more than two processes reserve portions of the two runs for merging at each node and having the processes simultaneously merge their portions of the runs at each node; and writing the larger run to an output device.

16. A method of merging records stored in shorter runs into a larger run, the method comprising the following steps:

providing a forecast structure, the structure having entries containing a key of a predetermined record in each run block of each run and a run block address;

sorting the entries in the forecast structure by the key of the predetermined record of each run block;

reading a number of the sorted run blocks from secondary storage into memory; and merging the run blocks in memory through a merge tree having a root node to produce a longer run.

17. The method of claim 16 wherein the sorting step comprises:

making an entry for each run block into a forecast structure including the key of the first record in the run block; and sorting the entries in the forecast structure by the key of the first record of each run block.

18. The method of claim 16 including:

creating for each shorter run a forecast stream of the sorted run blocks that can be read from secondary storage and written to memory; and referring to the forecast streams to determine which run blocks to read from secondary storage into memory.

19. The method of claim 18 including reading multiple run blocks appearing in the same forecast stream from the secondary storage in a single access.

20. The method of claim 16 including reading the key of the first record of a run block to avoid a deadlock in merging the run blocks.

21. The method of claim 16 including merging all records available at a node to avoid a deadlock in merging the run blocks.

22. The method of claim 16 including:

writing the longer run to an output device;

freeing the memory used by run blocks that have been written to the output device for receiving additional sorted run blocks; and repeating the steps of reading, merging, writing and freeing until the shorter runs have been read from secondary storage into memory and merged to produce the longer run.

23. The method of claim 22 in which the steps of reading, merging, writing and freeing are performed simultaneously by several processes.

24. Apparatus for sorting records with a multiprocessor computer system having memory and a set of processes running in parallel, comprising:

means for reading blocks of records from an input device and writing the blocks to memory;

means for sorting the records within each block simultaneously to create a run therein;

means for constructing a merge tree for merging the runs into an intermediate run that is output by the tree, the merge tree having nodes where two runs are merged to form another run;

means for simultaneously merging the runs throughout the merge tree to form the intermediate run;

means for writing intermediate runs to secondary storage;

means for determining an order in which run blocks of the intermediate runs will be read from secondary storage;

means for constructing a merge tree for merging the run blocks into a complete run that is output by the tree, the merge tree having nodes where two runs are merged to form another run;

means for reading the run blocks from the secondary storage and writing the run blocks to memory in the determined order for merging in the merge tree;

means for simultaneously merging runs throughout the merge tree to form the complete run; and means for writing the complete run to an output device.

25. A multiprocessor computer system for sorting records comprising:

memory;

multiple processors programmed to run merge processes in parallel in memory, at least several of the merge processes performing each of the following tasks as needed:

constructing a merge tree in memory; and merging of records at a tree node into runs.

26. The computer system of claim 25 wherein the several merge processes also perform each of the following tasks as needed:

sorting records at a tree node.

27. The computer system of claim 25 wherein the several merge processes also perform each of the following tasks as needed:

inputting of records into memory for sorting; and outputting of runs to secondary storage.

28. A computer-readable medium for storing a computer program comprising instructions for executing the method of claim 15.

29. A computer-readable medium for storing a computer program comprising instructions for executing the method of claim 16.

* * * * *

UNITED STATES PATENT AND TRADEMARK OFFICE
CERTIFICATE OF CORRECTION

PATENT NO. : 5,852,826

DATED : December 22, 1998

INVENTOR(S) : Graunke et al.

It is certified that error appears in the above-identified patent and that said Letters Patent is hereby corrected as shown below:

| Col./Line | | Should Read |
|---|---|---|
| 14/38 | merge tree for | merge tree in memory for |

Signed and Sealed this

Fourth Day of January, 2000

Attest:

*Attesting Officer*    *Acting Commissioner of Patents and Trademarks*